United States Patent [19]
Deisenhofer et al.

[11] Patent Number: 5,589,734
[45] Date of Patent: Dec. 31, 1996

[54] ELECTRIC LAMP HAVING A FLUORESCENCE-SUPPRESSED QUARTZ-GLASS ENVELOPE, AND QUARTZ GLASS THEREFOR

[75] Inventors: Manfred Deisenhofer, Altenmuenster; Dieter Meiss, Tuebingen; Ekkehard Messner, Augsburg, all of Germany

[73] Assignee: Patent-Treuhand-Gesellschaft F. Elektrische Gluehlampen mbH, Munich, Germany

[21] Appl. No.: 439,472

[22] Filed: May 11, 1995

[30] Foreign Application Priority Data

May 25, 1994 [DE] Germany .............. 44 18 198.1

[51] Int. Cl.[6] .............. H01J 17/16; H01J 61/30
[52] U.S. Cl. .............. 313/636; 313/112; 313/580; 501/54; 501/905; 428/34.4
[58] Field of Search ............. 313/493, 636, 313/112, 579, 580; 501/54, 152, 153, 134, 135, 905; 428/34.4

[56] References Cited

U.S. PATENT DOCUMENTS

| | | |
|---|---|---|
| 1,634,182 | 6/1927 | Gell et al. . |
| 3,527,711 | 9/1970 | Barber et al. . |
| 4,211,758 | 7/1980 | Buhrer . |
| 4,361,779 | 11/1982 | Van der Steen et al. . |
| 5,039,631 | 8/1991 | Krashkevich et al. . |
| 5,077,240 | 12/1991 | Hayden et al. . |
| 5,196,759 | 3/1993 | Parham et al. . |
| 5,464,462 | 11/1995 | Langer et al. .............. 501/153 |

FOREIGN PATENT DOCUMENTS

| | | |
|---|---|---|
| 0032763B1 | 7/1981 | European Pat. Off. . |
| 0478059A1 | 4/1992 | European Pat. Off. . |
| 0527461A3 | 2/1993 | European Pat. Off. . |
| 574158A1 | 12/1993 | European Pat. Off. . |
| WO91/11401 | 8/1991 | WIPO . |

*Primary Examiner*—Sandra L. O'Shea
*Assistant Examiner*—Matthew J. Esserman
*Attorney, Agent, or Firm*—Frishauf, Holtz, Goodman, Langer & Chick, P.C.

[57] ABSTRACT

To inhibit, or at least sharply attenuate, fluorescence of a quartz-glass envelope (10) surrounding a light source (11), such as a halogen incandescent lamp, a high-pressure discharge lamp, or the like, when the quartz glass is subjected to ultraviolet (UV) radiation from the light source, and has been doped with a UV radiation absorbing material, typically a cerium, or cerium-titanium doping, the quartz-glass envelope is additionally doped with praseodymium or a praseodymium compound, such as praseodymium oxide or praseodymium aluminate. The pure praseodymium in the doping is, preferably, present in quantities of between about 0.008 and 1.25%, by weight, with reference to the undoped quartz glass. Barium metaborate can also be used, preferably together with praseodymium to attenuate the fluorescence. Preferably, the praseodymium is used as a combined doping with cerium, in form of a cerium-praseodymium aluminate, added to the starting material for the quartz glass, and before the quartz glass is fused from quartz sand or pulverized quartz crystal.

16 Claims, 6 Drawing Sheets

ELECTRIC LAMP HAVING A FLUORESCENCE-SUPPRESSED QUARTZ-GLASS ENVELOPE, AND QUARTZ GLASS THEREFOR

Reference to related patent and application, the disclosures of which are hereby incorporated by reference: U.S. Pat. No. 5,196,759, Parham et al.; U.S. Ser. No. 08/120,729, filed Sep. 13, 1993, U.S. Pat. No. 5,464,462, issued Nov. 7, 1995, Langer et al., assigned to the assignee of the present application.

Reference to related publications: European 0 478 059 A1, van Hal et al.; European 0 032 763 B1, van der Steen et al., to which U.S. Pat. No. 4,361,779 corresponds

FIELD OF THE INVENTION

The present invention relates to an electric lamp having a bulb made of quartz glass which, in operation, has a tendency to fluoresce, in which the quartz glass is fluorescence-suppressed; and to quartz glass for such a bulb. The quartz-glass bulb is particularly suitable for making discharge vessels for discharge lamps, for making outer envelopes for high-pressure discharge lamps, and to make the bulb for halogen incandescent lamps.

In this specification, description and claims to follow, all percentages are understood to be by weight, unless otherwise noted.

BACKGROUND

Vessels or bulbs to enclose discharges or filaments, particularly high-pressure discharge lamps and halogen incandescent lamps, are subject to high thermal loading. To make such vessels, light-transmissive ceramics can be used, as well as quartz glass. Pure quartz glass which has a purity of up to about 99.99 mol-% silicic acid is transparent not only for visible light, but also for ultraviolet (UV) radiation. It is necessary to substantially attenuate UV radiation, which is, as radiated, a health hazard. One possibility is to dope the quartz glass which is used as the envelope or bulb for a discharge or for halogen incandescent lamps with suitable dopings which substantially reduce the emitted UV radiation to a safe level. Selection of doping materials, as well as concentration thereof, requires care since the physical characteristics of the quartz glass, for example viscosity, transparency, coloring of the glass, and tendency to crystallization, should not disadvantageously affect the characteristics of the lamp by the doping. Doping materials which are suitable are, primarily, cerium, added as an oxide, a silicate or an aluminate to the quartz powder which is prepared prior to melting the powder to form the quartz glass. A small further addition of titanium, added in the form of titanium oxide, additionally attenuates the particularly dangerous short-wave portion of the UV radiation.

The referenced U.S. Pat. No. 5,196,759, Parham et al., describes a quartz glass which is doped with up to 0.5% cerium oxide and additionally with titanium oxide. The cerium oxide corresponds to a pure cerium proportion of about 0.41%, by weight.

European 0 478 059 A1, van Hal, describes a quartz glass having a UV radiation absorbing doping formed of 0.1 mol-% cerium disilicate and 0.01 mol-% titanium oxide. This corresponds to a pure cerium portion within the quartz glass of about 0.47%, by weight.

Quartz glass can be doped with a higher proportion of cerium, and quartz glass with such higher cerium concentration is described in the referenced application U.S. Ser. No. 08/120,729, U.S. Pat. No. 5,464,462, issued Nov. 7, 1995, Langer et al., assigned to the assignee of the present application. Higher doping with cerium ensures that the dangerous UV radiation is sufficiently absorbed even if the bulbs or vessels are very thin. Cerium aluminate and titanium oxide are described in that application.

The absorption edge of the quartz glass is set to a wavelength of about 350 nm by such cerium-titanium doping. This reduces the transparency of the quartz glass for the undesired, potentially dangerous UV radiation to a tolerable level. Any remanent UV transparency of the quartz glass at wavelengths in the region of about 245 nm can be removed by glowing or annealing the quartz glass for several hours in an $O_2$ atmosphere.

The cerium in the glass emits a blue fluorescent radiation, stimulated by the UV radiation. This blue radiation can be utilized to improve the color rendition of electrical lamps within the blue spectral range, as described in the above-referenced publications and the application. In some uses, however, such additional blue component is not desired. For example, when using high-pressure discharge lamps in vehicular headlights, such increase of blue light component is undesired. What fluoresces is not the filament but the envelope or bulb, that is, the cerium in the bulb. When such a bulb is inserted in a reflector, or a similar optical system with specifically directed light emission, the blue fluorescence leads to an increase in stray light, which spreads the otherwise sharp light/dark boundary of the desired emitted light beam. For applications where only light from the emitted light source is desired, the fluorescent radiation of the cerium is undesired.

European 0 032 763 B1, to which U.S. Pat. No. 4,361,779 corresponds, van der Steen et al., describes a quartz-glass having a doping which suppresses UV radiation, so that the glass has 0.1 to 3% alkali metal oxide, 0.2 to 5% of a rare-earth metal oxide, and 0 to 0.5% of an alkaline earth metal oxide. Praseodymium oxide ($PRO_2$) or europium oxide ($Eu_2O_3$) are proposed; the alkali metal oxide is listed as potassium oxide ($K_2O$) in the examples. The rare-earth metal oxide functions as an absorber for UV radiation. The alkali metal oxide enhances the solubility of the rare-earth metal oxide in the quartz glass. The so doped quartz glass has an absorption edge at a wavelength of about 250 nm, that is, radiation with a wave length below 250 nm is absorbed in the quartz glass; the quartz glass is transparent for radiation having a wavelength higher than 250 nm. The UV radiation in the wavelength range of between 350 nm and 250 nm is transmitted with hardly any attenuation. Consequently, this quartz glass is entirely unsuitable as a bulb or a discharge vessel enclosure for high-pressure discharge lamps, nor for an outer envelope or shield therefor. Besides these dopings, UV radiation with a wavelength of above 250 nm must also be suppressed.

THE INVENTION

It is an object to provide lamps having a light source which provides, besides visible light, radiation in the UV spectral range, in which the lamp has very low or practically no UV radiation at all, nor does it emit fluorescent radiation within the visible spectral range; and specifically a glass suitable for such a bulb or vessel or envelope which has this low transparency in the UV spectral range without fluorescent radiation, and which is suitable for making discharge vessels for high-pressure discharge lamps, outer envelopes or shield elements for high-pressure discharge lamps, or bulbs for halogen incandescent lamps, for example.

Briefly, the lamp has a bulb or discharge vessel which is doped with cerium to suppress UV radiation and, additionally, in order to highly attenuate the blueish fluorescent radiation stimulated in the cerium by the UV radiation from the light source, the bulb or vessel is additionally doped with praseodymium oxide ($PRO_2$), or a praseodymium compound.

In accordance with a feature of the invention, the doping substances and quantities are so controlled that the absorption edge of the quartz glass is at about 350 nm, so that practically no UV radiation is transmitted or if so, only in an amount which is readily tolerated. The praseodymium addition in the quartz glass quenches the fluorescence of the cerium. The probability of radiating transitions within the atomic spectrum of the cerium decreases substantially and, consequently, the probability of transition of the cerium ions, excited by the UV radiation without causing external radiation, is correspondingly increased. The praseodymium, similar to cerium, also absorbs UV radiation, so that the proportion of cerium can be decreased as the praseodymium proportion increases, thereby further decreasing the tendency of the glass to fluoresce.

Preferably, cerium and desirably also the praseodymium are added to quartz powder in the form of aluminates before the quartz powder is fired to make the glass. These compounds have the advantage with respect to oxides, and particularly with respect to the four-valent cerium oxide ($Ce_2O_4$), that, if the fusing of the quartz powder is carried out in a tungsten boat, the aluminates will not liberate any oxygens which, otherwise, might oxidize the tungsten boat. Additionally, the aluminum which is added by the aluminate increases the solubility of the cerium as well as that of the praseodymium within the quartz glass, so that a pure cerium or praseodymium portion of up to 1.25% by weight, with reference to undoped quartz glass, can be obtained in the quartz glass, without non-homogeneous regions occurring within the quartz glass, or causing the quartz glass to have a tendency to devitrification.

The quartz glass for use in the lamps of the present invention may have a small addition of titanium doping, which further improves the absorption of short-wave UV radiation, that is, UV radiation within the UV-C range of the quartz glass. The curves in the Figures, and particularly curve 2 in FIG. 1B, show that the quartz glass doped in accordance with the present invention with cerium and praseodymium, has sufficient absorption, especially in the shortwave UV range. Titanium doping, FIG. 1B, curve 1, in accordance with the prior art, can thus be replaced by the praseodymium doping. The praseodymium acts, thus, not only as inhibiting fluorescence, but further as an absorption element for the short-wave UV radiation.

In accordance with a feature of the invention, the quartz glass can additionally be doped with a boron compound, for example barium metaborate. This further reduces the fluorescence of the quartz glass. Addition of barium metaborate decreases the viscosity of quartz glass. This permits simpler and more energy efficient handling. The barium borate addition, however, decreases the capability of thermal loading of the quartz glass. A quartz glass which has the barium borate addition, thus, is highly suitable for an outer shield or shroud for nigh-pressure discharge lamps, or for lightly loaded bulbs of halogen incandescent lamps.

DETAILED DESCRIPTION

Figure 1A:
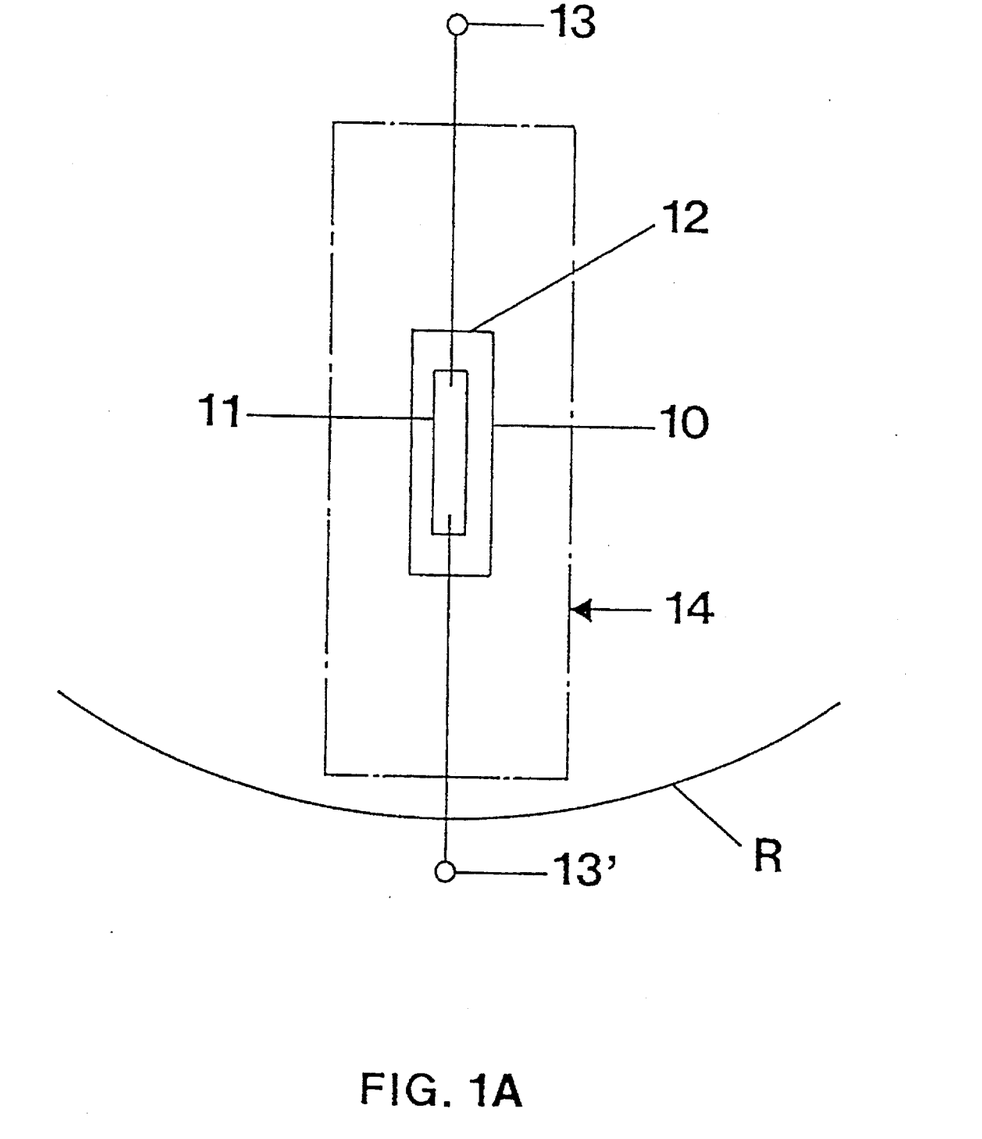
FIG. 1A is a highly schematic illustration of a lamp having a quartz-glass bulb or discharge vessel in which UV radiation as well as fluorescence is effectively suppressed.
Figure 1B:
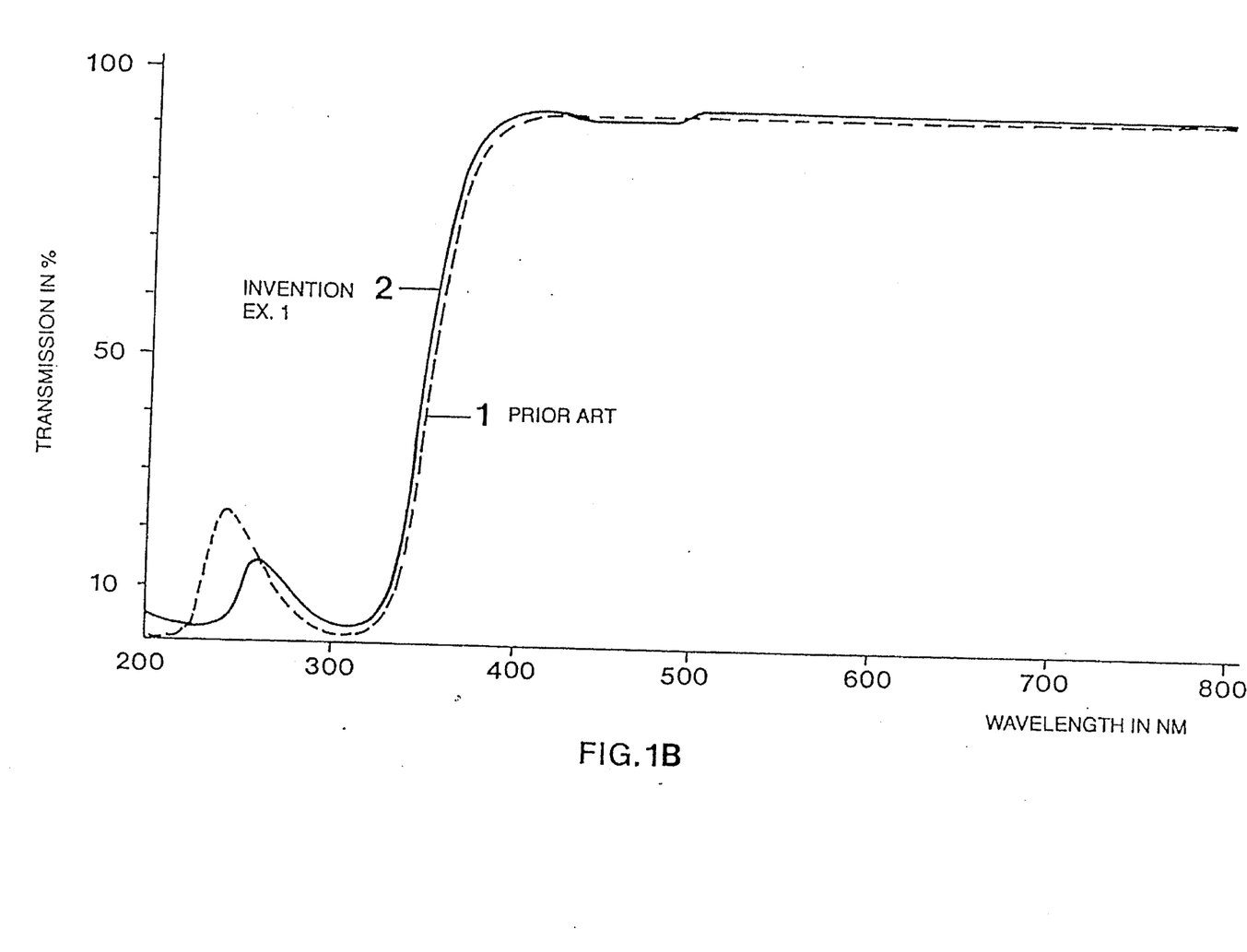
FIG. 1B shows transmission curves, with respect to wavelengths (abscissa), for a quartz glass doped with cerium and titanium (0.5% $CeAlO_3$ and 0.04% $TiO_2$) in accordance with the prior art (graph 1) and a quartz glass doped with cerium-praseodymium aluminate (1.25% $Ce_{0.4}Pr_{0.6}AlO_3$) (graph 2)

Referring first to FIG. 1:

The lamp 12, in accordance with the present invention, has a lamp bulb or vessel 10 which encloses a suitable light source 11. The light source 11, shown only schematically in block form, may for example be an incandescent filament, and the bulb or vessel 10 retains a fill which includes halogen, so that the filament operates in a halogen regenerative cycle. The light source 11 may, however, also be a high-pressure discharge lamp, in which case the envelope 10 will retain a suitable fill therein which can be excited by an arc discharge. The lamp 12, constituted by the envelope 10 and the light source 11, can be connected to a suitable electric supply at terminals 13, 13'. If the lamp 12 is a high-pressure discharge lamp which, due to its power rating or construction, is subject to possible explosion or implosion, it can be surrounded, as well known, by a shield or shroud or outer envelope 14.

The lamp 12 is shown only schematically. The envelope, of course, could be part of an optical system, e.g. a reflector structure R, shown only schematically in fragmentary form—see, for example, the referenced U.S. Pat. No. 5,196,759, Parham et al. In such a structure, it is important that the light source 11 is located at a specific optical point in the optical system, for example at or near the focal point of the reflector, and no light be emitted from the bulb or vessel structure 10 itself.

The starting material to make the bulb 10, which is made of quartz glass, is quartz sand and/or rock crystal. This material has more than 99.9 mol-% silicic acid ($SiO_2$). The material is pulverized, and the doping substances, likewise pulverized, are added to the quartz sand or pulverized rock crystal before the quartz glass is made. They are homogenized with the starting material.

Example 1, with reference to FIG. 1:

Quartz sand or pulverized rock crystal forms the starting material, to which 1.25% by weight of cerium-praseodymium aluminate ($Ce_{0.4}Pr_{0.6}AlO_3$) are added as a doping material. The weight percentages, generally, relate to the starting material, that is, with respect to the quartz sand or rock crystal, which is used as the basic raw material to melt and form the quartz glass.

The wall thickness of quartz-glass samples, made from the melted quartz glass, is about 1 mm.

In this example, the mol relationship of cerium to praseodymium in the cerium-praseodymium aluminate compound is 2/3. The pure cerium proportion within the quartz glass can be calculated to about 0.32%, by weight, and the pure praseodymium proportion to about 0.49%, by weight.

FIG. 1B shows the contrast in the transmission behavior, with respect to wavelength, of quartz glass doped in accordance with this example, in comparison to a quartz glass doped only with cerium-titanium in accordance with the prior art, and illustrating specifically the spectral range of between 200 nm and 800 nm. Thus, the spectral ranges which are tested are the short-wave UV-C radiation band, the UV-B radiation band, as well as the UV-A radiation band, and the visible spectral range. The transmission is shown on the ordinate in percent transmission and relates to the intensity of the radiation applied to the quartz-glass sample. Approximately 6.5% of the applied radiation is reflected, so that a transmission ratio of 93.5% means that, with the respective radiation wavelength, the radiation can pass through the quartz glass without attenuation.

Curve 1 in FIG. 1B shows the transmission behavior for quartz glass in accordance with the prior art, that is, a comparable starting material which is doped with 0.5% cerium aluminate ($CeAlO_3$) and 0.04% titanium dioxide ($TiO_2$), which corresponds to a pure cerium proportion of about 0.33%. Curve 2 shows the transmission characteristics of the quartz glass doped in accordance with Example 1 of the present invention.

A comparison will clearly show that, within the visible spectral range above about 350 nm, both samples have a transmissivity of more than 90%. In the UV spectral range, that is, below about 350 nm, the transmissivity drops to values of below 5%. There is an increased remaining transmission in wavelengths in the range of about 240 nm and 270 nm, respectively. In the cerium-titanium doped quartz glass, this remaining transmission is about 25%; in the glass in accordance with the present invention, due to the addition of the praseodymium, only about 15%.

The still high remaining transmission at 245 nm wavelength can, in the glass in accordance with the prior art, be reduced or effectively eliminated by heating the glass to glow temperature in an oxygen atmosphere. Apart from this remaining transmission, both quartz-glass samples have roughly comparable good absorption characteristics within the UV region and good transmission characteristics within the visible spectral range. A substantial difference between the two samples, however, is in the behavior with respect to fluorescence.

Figure 4:
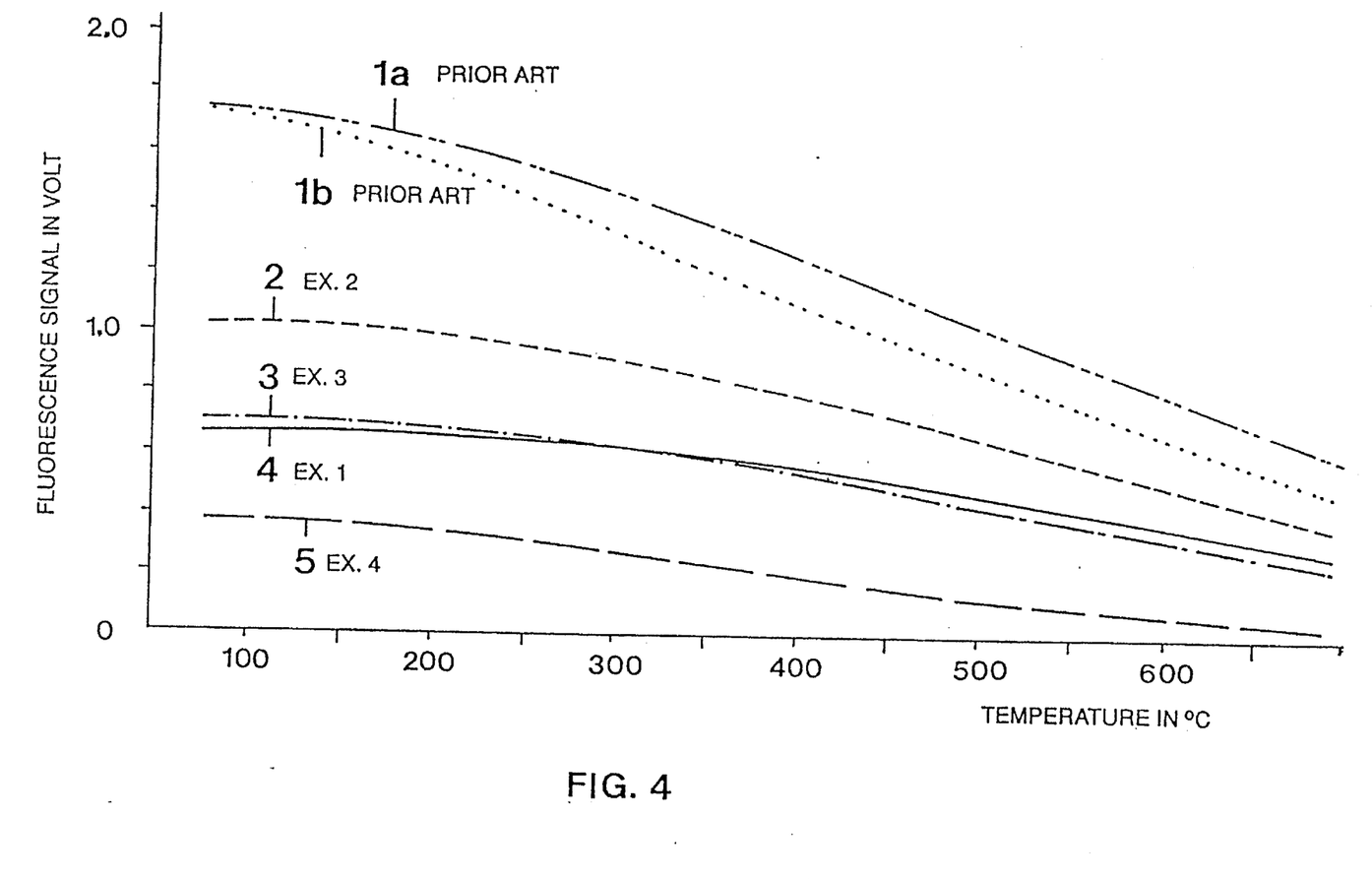
FIG. 4 is a graph, with respect to temperature (abscissa), of fluorescent radiation of a doped quartz glass in accordance with the respective examples of the present invention, and in comparison with a quartz glass doped with cerium-titanium in accordance with the prior art (graphs 1a, 1b)

Referring now to FIG. 4, where the clear difference, with respect to fluorescence, of the light source envelope 10 is shown: In the entire temperature range of from between 25° C. to 650° C. the quartz glass doped in accordance with the first example of the present invention, see FIG. 4, curve 4, has a substantially reduced fluorescent signal with respect to the quartz glass in accordance with the prior art, FIG. 4, curve 1a, although the proportion of cerium in both samples of the quartz glass is approximately the same. The addition of praseodymium is responsible for the attenuation of the fluorescent radiation.

Figure 2:
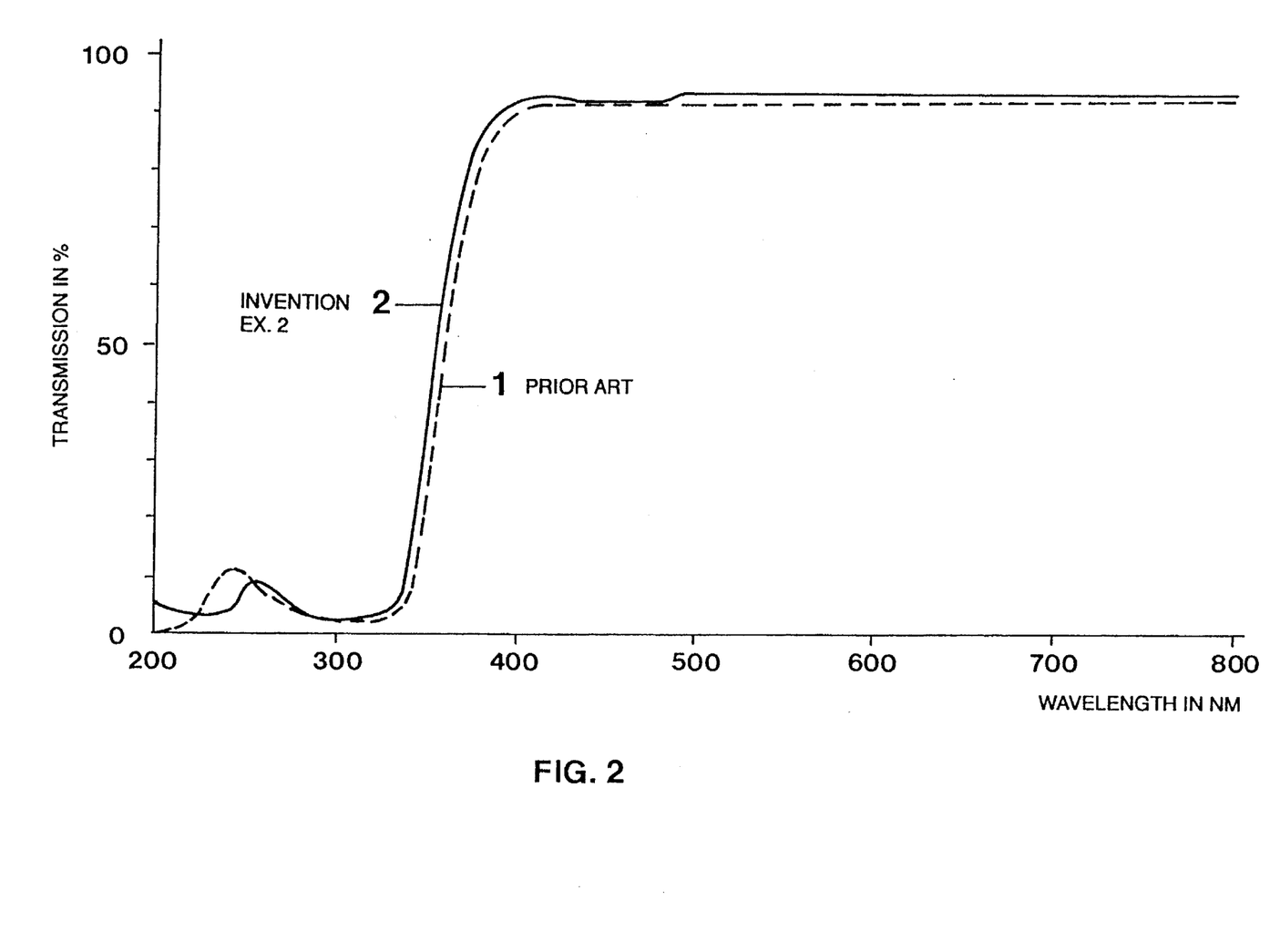
FIG. 2 illustrates radiation transmission curves for a quartz glass doped with cerium titanium (1% $CeAlO_3$ and 0.05% $TiO_2$) in accordance with the prior art (graph 1) and a quartz glass with cerium-praseodymium aluminate (1.17% $Ce_{0.6}Pr_{0.4}AlO_3$) (graph 2), and illustrating another embodiment of the present invention.

Example 2, with reference to FIG. 2:

The quartz-glass sample has a thickness of about 1 mm. The starting material is doped with 1.17% cerium-praseodymium aluminate ($Ce_{0.6}Pr_{0.4}AlO_3$). In contrast to Example 1, the relative mol content of cerium to praseodymium in the cerium-praseodymium aluminate is 3/2. Consequently, the pure cerium component in the quartz glass can be calculated at 0.46% and the pure praseodymium content at about 0.31%, by weight. In spite of the overall smaller concentration of doping material, the quartz glass in accordance with the second example has a higher cerium content than the quartz glass of Example 1. The smaller remaining transmission in the wavelength below 300 nm is, apparently, based on the higher cerium content.

The remaining transmission in the wavelength range of about 270 nm, in Example 2, is below 10%. At wavelengths above 300 nm, the transmission behavior of the two quartz-glass samples does not show any significant differences. The transmission behavior of a prior art cerium-titanium doped quartz-glass sample is shown for comparison purposes in curve 1 of FIG. 2. This sample has 1% cerium aluminate ($CeAlO_3$) and 0.05% titanium oxide ($TiO_2$) as doping materials. The pure cerium proportion here is about 0.65%, by weight. Above 300 nm, the two curves of FIG. 2 do not show significant differences. The remaining transmission of the cerium-titanium doped sample, see FIG. 2, curve 1, is shifted towards the short-wave UV range and is at about 245 nm. At about 12%, it is slightly higher than the remaining transmission of the quartz-glass sample in accordance with the present invention, see FIG. 2, curve 2.

The fluorescent signal emitted by the quartz-glass sample in accordance with Example 2 is shown in FIG. 4, curve 2. Due to the higher cerium content, and the higher cerium-praseodymium mol relationship in a cerium-praseodymium aluminate, the degree of fluorescence is higher than in Example 1, FIG. 4, curve 4. Yet, the fluorescent signal of the quartz glass in accordance with Example 2, FIG. 4, curve 2, is still substantially less than a quartz-glass sample in accordance with the Prior art, that is, doped only with a cerium-titanium doping substance, FIG. 4, curves 1a and 1b. Curve 1a relates to quartz glass doped with 0.5% cerium aluminate ($CeAlO_3$) and 0.04% titanium oxide ($TiO_2$) as described in connection with example 1 of FIG. 1B, and curve 1b relates to quartz glass doped with 1.0% cerium aluminate ($CeAlO_3$) and 0.05% titanium oxide ($TiO_2$) as described in connection with example 2 of FIG. 2.

Figure 3:
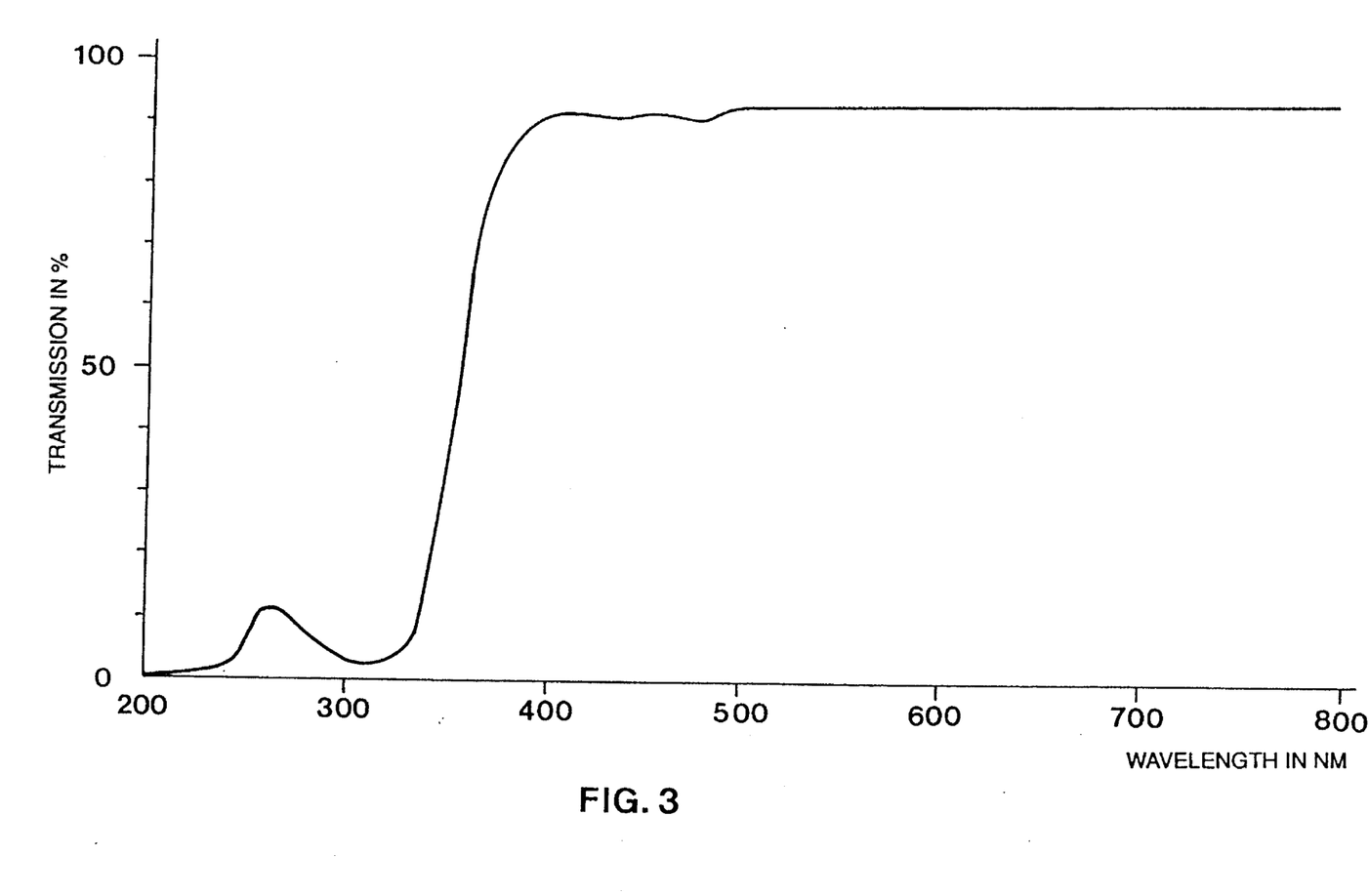
FIG. 3 is a transmission curve for a quartz glass doped with cerium-praseodymium titanium (0.5% $CeAlO_3$, 0.5% $Pr_6O_{11}$, and 0.04% $TiO_2$)

Example 3, with reference to FIG. 3:

The quartz-glass sample has a thickness of about 1 mm. It is doped with a cerium-praseodymium titanium doping mixture, having 0.5% cerium aluminate ($CeAlO_3$), 0.5% praseodymium oxide ($Pr_6O_{11}$) and 0.05% titanium oxide ($TiO_2$). Starting material, again, is quartz sand or rock crystal. The doping additives are mixed, in powdered form, to the starting material. The pure cerium proportion in the quartz glass can be calculated to about 0.33%, the pure praseodymium content to about 0.41% and the pure titanium content to only about 0.03%.

For wavelengths above 300 nm, the transmission characteristics of this embodiment do not show significant differences with respect to the glasses of Example 1 or 2. The absorption edge again, as before, is in the range of about 340 nm to 350 nm. A slightly higher remaining transmission can be seen in the range of about 270 nm. For wavelengths below 240 nm, transmission of the quartz glass is negligible, due to the additional doping with titanium. The fluorescence of this embodiment is shown in FIG. 4, curve 3, and hardly differs from that of the first embodiment, FIG. 4, curve 4.

Curve 3, illustrating the fluorescence condition of Example 3, is drawn in chain-dotted form.

Example 4:

The quartz-glass sample is made similar to that of Example 3, with a cerium-praseodymium titanium doping. Additionally, however, barium metaborate ($BaB_2O_4$) is added as a doping substance.

Overall, the doping in accordance with this embodiment is 0.5% cerium aluminate ($CeAlO_3$), 0.5% praseodymium oxide ($Pr_6O_{11}$) 0.05% titanium oxide ($TiO_2$) and 1% barium metaborate ($BaB_2O_4$).

The transmission characteristics of this quartz-glass sample which, again, has a wall thickness of about 1 mm, is similar to that of Example 3, FIG. 3, since the barium metaborate influences the radiation transmission of the quartz glass within the wavelength of between 200 nm to 800 nm only insignificantly. The fluorescence of the quartz glass, however, is additionally substantially reduced by the addition of the barium metaborate, as seen when comparing curve 5 of FIG. 4 with curve 3 third example). In the relevant temperature range of about 650° C., which is significant for operation of lamp 12, the fluorescent signal of the embodiment of curve 5, FIG. 4, almost entirely disappears.

The addition of barium metaborate leads to a decrease of the viscosity of the quartz glass. Accordingly, the quartz glass of Example 4 is suitable only for lamp parts which are not highly loaded. For example, they can be used for vessels or bulbs 10 of low-power halogen incandescent lamps; they are particularly useful as surrounding shrouds, shields or outer envelopes 14 for high-pressure discharge lamps, that is, when the lamp 12 is a high-pressure discharge lamp.

The fluorescence signals, schematically represented at the ordinate in FIG. 4, were determined by means of a fluorescence sensor which transformed the fluorescence signal into a d-c voltage of less than about 2 V. The test samples were heated in a furnace from room temperature up to 650° C. The temperature was measured by a thermal couple and a comparable reference element. To excite the blue fluorescent radiation of the cerium, the 365 nm radiation spectral line of a mercury high-pressure lamp was used. The quartz-glass samples were made from laboratory melted samples, polished flat on both sides, with a nominal wall thickness of about 1 mm, and specifically 1.2 mm.

Figure 5:
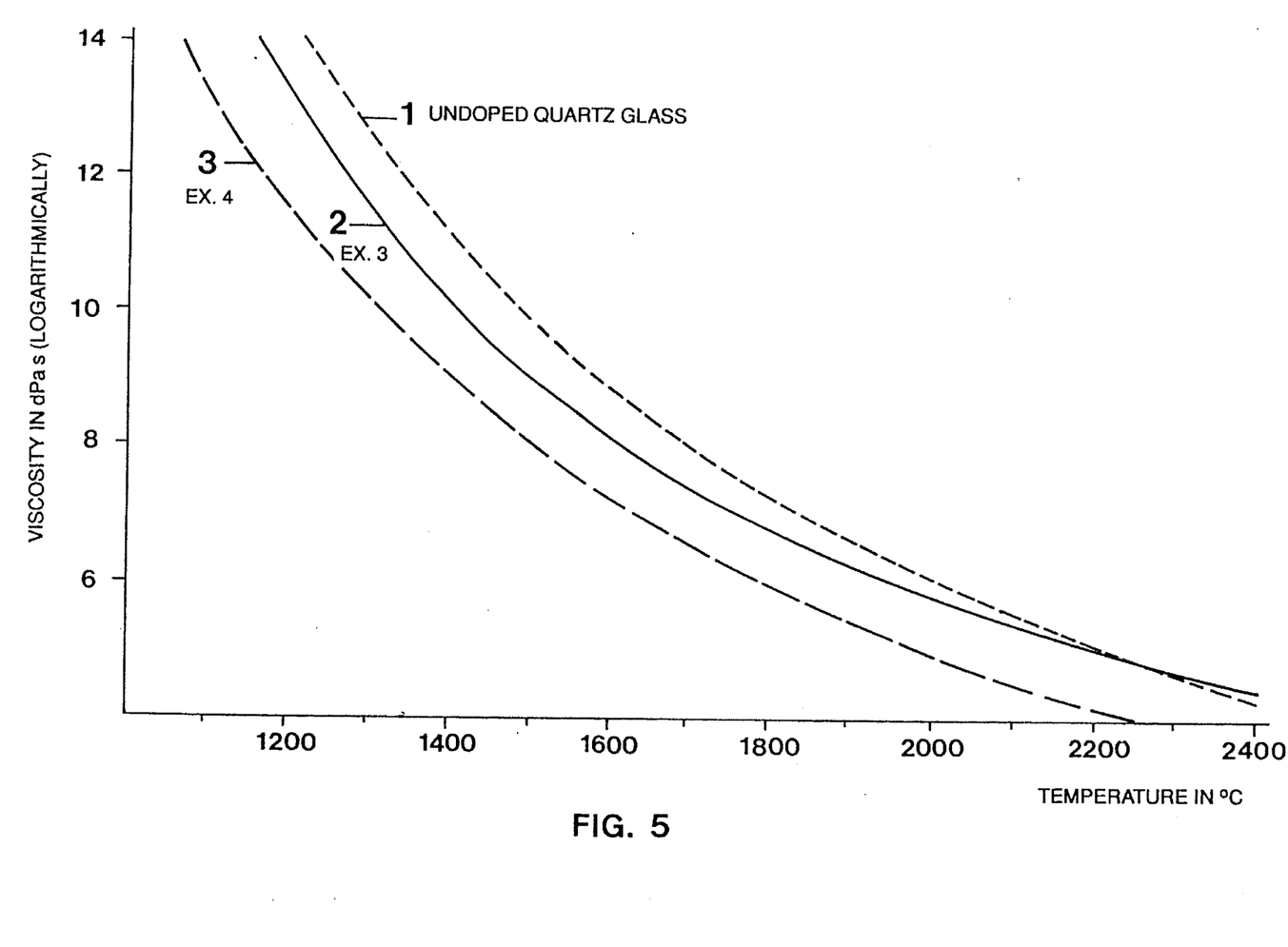
FIG. 5 illustrates the viscosity with respect to temperature (abscissa) of the quartz glass in accordance with the present invention, in comparison with undoped quartz glass (graph 1).

FIG. 5 illustrates the temperature dependency of viscosity. Viscosity in the range of from 1100° C. to 2400° C. of the quartz-glass samples of Example 3, curve 2, and Example 4, curve 3, were compared with quartz glass which was not doped, curve 1. The vertical axis illustrates the base 10 log of viscosity in deci-Pascal seconds (dPa s). The measurements were made by a drill viscosimeter.

The curves of FIG. 5 clearly show that the characteristic viscosity points at the lower cooling point, that is, at $10^{14.5}$ dPa s, the upper cooling point at $10^{13.0}$ dPa s, and the Littleton point at $10^{7.6}$ dPa s, are shifted in the doped quartz-glass samples towards lower temperatures.

The quartz glass in accordance with Example 4 (FIG. 5, curve 3 in dashed form), due to the viscosity points which are at comparable lower temperatures, is considered to be a "soft" quartz glass. Such a glass is not suitable for thermally extremely highly loaded elements, such as highly loaded lamp parts, typically discharge vessels of high-pressure discharge lamps. It can be readily used to form outer shields, shrouds or envelopes 14 (FIG. 1A) and has the advantage of a low manufacturing temperature. Curve 2 of FIG. 5 shows the viscosity characteristics of a quartz-glass sample in accordance with the above-described Example 3. This is a "hard" quartz glass, also suitable for manufacturing thermally highly loaded discharge vessels of high-pressure discharge lamps.

The viscosity curves of the quartz-glass-samples in accordance with the above-described Examples 1 and 2 are similar to those of curve 2 of FIG. 5. These glasses, also, are considered "hard" quartz glasses and thus are suitable for manufacturing thermally extremely highly loaded lamp portions, such as the discharge vessel or bulb 10 of a lamp 12. Since not all discharge vessels require outer shields, shrouds or envelopes 14, the shroud 14 is shown in broken-line form in FIG. 1A.

The present invention is not limited to the examples described. For example, the cerium-praseodymium relationship and the cerium-praseodymium aluminate ($Ce_xPr_{1-x}AlO_3$, wherein $0<x<1$), in accordance with the embodiments of Examples 1 and 2, can be suitably varied. The doping materials may be added to the quartz glass or rock crystal also in other forms. For example, cerium and praseodymium can be added as a mixture of cerium aluminate and praseodymium aluminate, or as oxides or silicates, to the quartz-glass melt. The upper limit for the cerium and praseodymium proportion within the quartz glass is determined by solubility of the respective doping substances within the quartz glass, and by the maximum permitted decrease in viscosity. Upper limits for the pure cerium or praseodymium proportion within the quartz glass are in the order of about 2.5% by weight for suitable commercial applications of the glass. The addition of barium metaborate, which further suppresses fluorescence, but decreases the viscosity, can be increased up to a proportion of about 2% by weight if particularly soft quartz glass with low working temperature is desired. The examples given, thus, illustrate particularly preferred embodiments for use in halogen incandescent lamps and high-pressure discharge lamps which, otherwise, can be of any suitable and commercial configuration, with or without an external envelope 14, as desired.

In general, the proportion of pure cerium, with reference to undoped quartz glass, is between about 0.06 and 1%, by weight; and the proportion of pure praseodymium, with reference to undoped quartz glass, is between about 0.008 and 1.25%, by weight. When used, barium metaborate ($BaB_2O_4$) is present in the quartz glass between 0.01 and 2%, by weight, with reference to undoped quartz glass. The titanium compound comprises titanium oxide ($TiO_2$), and is present between about 0.01 and 0.15%, by weight, with reference to undoped quartz glass. Overall, the quartz glass, with reference to undoped quartz glass, comprises between about 0.1 and 1.5% cerium aluminate ($CeAlO_3$), 0 and 0.15% titanium oxide ($TiO_2$), the cerium aluminate and titanium oxide forming a first doping material; and 0.01 and 1.5% praseodymium oxide ($Pr_6O_{11}$), and 0 and 2.0% barium metaborate ($BaB_2O_4$), the praseodymium oxide and barium metaborate forming a further doping material, all percentages by weight.

We claim:

1. A lamp (12) having a lamp bulb or vessel (10) of quartz glass, and a light source (11) which, in operation, emits radiation in the ultraviolet (UV) spectral range, located in said quartz glass bulb or vessel (10), wherein the quartz glass of the bulb or vessel includes a first doping material comprising cerium, absorbing UV radiation, and being stimulated to fluorescence within the visible spectrum by said UV radiation; and wherein the quartz glass of the bulb or vessel further includes a further doping material comprising praseodymium or a praseodymium compound, suppressing, or at least substantially attenuating said fluorescence of the quartz glass of the bulb or vessel (10).

2. The lamp of claim 1, wherein the further doping material includes barium and boron.

3. The lamp of claim 1, wherein the proportion of pure cerium, with reference to undoped quartz glass, is between about 0.06 and 1%, by weight.

4. The lamp of claim 1, wherein the proportion of pure praseodymium, with reference to undoped quartz glass, is between about 0.008 and 1.25%, by weight.

5. The lamp of claim 1, wherein said first doping material comprises cerium aluminate ($CeAlO_3$).

6. The lamp of claim 1, wherein the praseodymium compound is praseodymium oxide ($Pr_6O_{11}$).

7. The lamp of claim 1, wherein the praseodymium compound is praseodymium aluminate ($PrAlO_3$).

8. The lamp of claim 1, wherein said first and further doping material are combined to form one compound which comprises cerium-praseodymium aluminate ($Ce_xPr_{1-x}AlO_3$), wherein $0<X<1$.

9. The lamp of claim 1, wherein an additional doping material comprising barium metaborate ($BaB_2O_4$) is present in the quartz glass between about 0.01 and 2%, by weight, with reference to undoped quartz glass.

10. The lamp of claim 1, wherein the first doping material includes titanium or a titanium compound.

11. The lamp of claim 10, wherein the titanium compound comprises titanium oxide ($TiO_2$), and is present between about 0.01 and 0.15%, by weight, with reference to undoped quartz glass.

12. The lamp of claim i, wherein the quartz glass, with reference to undoped quartz glass, comprises between about 0.1 and 1.5% cerium aluminate ($CeAlO_3$), 0 and 0.15% titanium oxide ($TiO_2$), said cerium aluminate and titanium oxide forming a first doping material; and 0.01 and 1.5% praseodymium oxide ($Pr_6O_{11}$), and 0 and 2.0% barium metaborate ($BaB_2O_4$), the praseodymium oxide and barium metaborate forming a further doping material, all percentages by weight.

13. The combination of a radiation source which emits radiation in the ultraviolet (UV) spectral range with a quartz glass, subjected to said radiation, wherein said quartz glass includes a first doping material comprising cerium, absorbing UV radiation, said quartz glass being stimulated to fluorescence within the visible spectrum by said UV radiation; and wherein the quartz glass includes a further doping material comprising praseodymium or a praseodymium compound suppressing or at least substantially attenuating said fluorescence of the quartz glass when subjected to said radiation.

14. The combination of claim 12, wherein said further doping material includes barium and boron.

15. The combination of claim 13, wherein said first and further doping material are combined to form one compound which comprises cerium-praseodymium aluminate ($Ce_xPr_{1-x}AlO_3$), wherein $0<X<1$.

16. The combination of claim 13, wherein the praseodymium compound comprises at least one of: praseodymium oxide ($Pr_6O_{11}$) and praseodymium aluminate ($PrAlO_3$), and the proportion of pure praseodymium, with reference to undoped quartz glass, is between about 0.008 and 1.25%, by weight.

\* \* \* \* \*